(12) United States Patent
Mita et al.

(10) Patent No.: US 7,197,149 B1
(45) Date of Patent: Mar. 27, 2007

(54) CELLULAR PHONE

(75) Inventors: Ryota Mita, Hitachinaka (JP); Akio Shinagawa, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 790 days.

(21) Appl. No.: 09/669,032

(22) Filed: Sep. 25, 2000

(30) Foreign Application Priority Data

Oct. 29, 1999 (JP) .................................. 11-307987

(51) Int. Cl.
*H03G 5/00* (2006.01)

(52) U.S. Cl. ......................................... 381/98; 84/619

(58) Field of Classification Search .......... 84/600–612, 84/615–618, 622–627, 649–651, 653–656, 84/659–663, 657, 685, 619, 634; 381/58, 381/59, 98
See application file for complete search history.

(56) References Cited

U.S. PATENT DOCUMENTS

| | | | |
|---|---|---|---|
| 5,099,513 A | | 3/1992 | Kim et al. |
| 5,668,337 A * | | 9/1997 | Kondo et al. .................. 84/609 |
| 5,973,252 A * | | 10/1999 | Hildebrand .................. 84/603 |
| 6,100,462 A * | | 8/2000 | Aoki ............................ 84/613 |
| 6,121,533 A * | | 9/2000 | Kay ............................. 84/616 |
| 6,125,264 A | | 9/2000 | Watanabe et al. |
| 6,501,967 B1 * | | 12/2002 | Makela et al. .............. 455/567 |

FOREIGN PATENT DOCUMENTS

| | | |
|---|---|---|
| JP | 04-316095 A | 11/1992 |
| JP | 10-150505 A | 6/1998 |
| JP | 11-103332 A | 4/1999 |

* cited by examiner

*Primary Examiner*—Vivian Chin
*Assistant Examiner*—Corey Chau
(74) *Attorney, Agent, or Firm*—Townsend and Townsend and Crew LLP

(57) ABSTRACT

A cellular phone is provided with a melody sound reproducing unit comprising: a speaker for providing specified output in a range between a first frequency and a second frequency; a signal generator for supplying an audio signal to the speaker; a memory for storing signal data corresponding to an audio signal to be generated by the signal generator; and a controller for controlling the signal generator based on the signal data, wherein the signal data is stored in the memory when the frequency of the corresponding audio signal is in a range between the first frequency and the second frequency, and the audio signal whose frequency is in a range between the first frequency and the second frequency is supplied to the speaker.

14 Claims, 7 Drawing Sheets

| SCALE | FREQUENCY (HZ) | SCALE | FREQUENCY (HZ) | SCALE | FREQUENCY (HZ) |
|---|---|---|---|---|---|
| C#2 | 138.6 | C#3 | 277.2 | C#4 | 554.4 |
| D2 | 146.8 | D3 | 293.7 | D4 | 587.3 |
| D#2 | 155.6 | D#3 | 311.1 | D#4 | 622.3 |
| E2 | 164.8 | E3 | 329.6 | E4 | 659.3 |
| F2 | 174.6 | F3 | 349.2 | F4 | 698.5 |
| F#2 | 185.0 | F#3 | 370.0 | F#4 | 740.0 |
| G2 | 196.0 | G3 | 392.0 | G4 | 784.0 |
| G#2 | 207.7 | G#3 | 415.3 | G#4 | 830.6 |
| A2 | 220.0 | A3 | 440.0 | A4 | 880.0 |
| A#2 | 233.1 | A#3 | 466.2 | A#4 | 932.3 |
| B2 | 247.0 | B3 | 493.3 | B4 | 987.8 |
| C3 | 261.6 | C4 | 523.3 | C5 | 1047 |

(a)

(b)

CELLULAR PHONE

CROSS-REFERENCES TO RELATED APPLICATIONS

This application claims priority from Japanese Patent Application Reference No. 11-307987, filed Oct. 29, 1999.

BACKGROUND OF THE INVENTION

The present invention relates to a cellular phone that signals receipt of a call by using a melody, and particularly to a cellular phone suitable to generate receiving sound that comprises of a plurality of tones.

A conventional receiving sound generator of a cellular phone supplies a signal corresponding to a melody stored in a memory to a speaker as it is.

Since smaller size and lighter weight is required of a cellular phone, a speaker for producing receiving sound used in the cellular phone is of small size. Generally, a speaker with a diameter of about 20 mm is used. In such a small-sized speaker, a frequency range is limited to that between a low frequency of about 400 Hz and a high frequency of about 8 kHz. In this frequency range, a range of about 600 Hz to about 5 kHz allows a sufficient level of sound pressure to be generated. Conventionally, when a signal corresponding to a receiving melody is supplied to such a speaker, the inputted signal is not outputted as sound in a range lower than 400 Hz or in a range higher than 8 kHz, and yet only electric power is consumed. On the other hand, the power allowed to be inputted to a speaker includes power consumed in a frequency range where a signal is not outputted as sound. Therefore, if an input signal includes a signal outside of a frequency range of 400 Hz to 8 kHz, the level of the input signal in the frequency range of 400 Hz to 8 kHz needs to be lowered in order to control the input power to within an allowable value. The level of the input signal needs to be controlled to a low level especially when a melody is to be accompanied by a chord, because the chord may include a signal for high-pitched sound or low-pitched sound that falls outside of the frequency range of 400 Hz to 8 kHz. Thus, it has been difficult to increase the volume of receiving sound. In order to solve this problem, supplying an input signal through a bandpass filter has been considered. However, the method of supplying an input signal through a bandpass filter has a problem in that if a melody includes a note having a frequency outside of the frequency range of 400 Hz to 8 kHz, the note is omitted, thereby resulting in an sounding melody. If a melody is accompanied by a chord and one of the chord notes falls outside of the frequency range of 400 Hz to 8 kHz, the chord is not formed, and therefore the sound may be perceived as strange when the melody is heard.

SUMMARY OF THE INVENTION

An object of the present invention is to provide a cellular phone that makes it possible to reproduce a melody for signaling receipt of a call without impairing musical data, and to increase the volume of receiving sound.

In order to solve the problem described above, there is provided a melody sound reproducing unit according to the present invention, comprising: a speaker for providing specified output in a range between a first frequency and a second frequency; a signal generating means for supplying an audio signal to the speaker; a memory means for storing signal data corresponding to an audio signal to be generated by the signal generating means; and a control means for controlling the signal generating means based on the signal data; wherein the signal data is stored in the memory means when the frequency of the corresponding audio signal is in a range between the first frequency and the second frequency, and the audio signal whose frequency is in a range between the first frequency and the second frequency is supplied to the speaker.

In addition, in order to solve the problem described above, there is provided a melody sound reproducing method for a melody sound reproducing unit according to the present invention, the reproducing unit including a speaker for providing specified output in a range between a first frequency and a second frequency; a signal generating means for supplying an audio signal to the speaker; a memory means for storing signal data corresponding to an audio signal to be generated by the signal generating means; and a control means for controlling the signal generating means based on the signal data; wherein the signal data is stored in the memory means when the frequency of the corresponding audio signal is in a range between the first frequency and the second frequency, and the audio signal whose frequency is in a range between the first frequency and the second frequency is supplied to the speaker.

In a preferred embodiment, the memory means stores a plurality of pieces of signal data having first tone data in specified order and stores a plurality of pieces of signal data having second tone data in specified order, and the control means controls the signal generating means in such a manner that an audio signal corresponding to the signal data having the first tone data and an audio signal corresponding to the signal data having the second tone data are generated simultaneously.

In another preferred embodiment, when an audio signal corresponding to the signal data having the first tone data and an audio signal corresponding to the signal data having the second tone data are generated simultaneously, the audio signal corresponding to the signal data having the first tone data and the audio signal corresponding to the signal data having the second tone data form a chord relation with each other in terms of their intervals and scales.

According to the present invention, it is possible to provide a cellular phone that makes it possible to reproduce a melody for signaling receipt of a call without impairing musical data, and to increase the volume of receiving sound.

DESCRIPTION OF THE SPECIFIC EMBODIMENTS

A first embodiment of the present invention will be described with reference to FIGS. 1 to 7.

Figure 1:
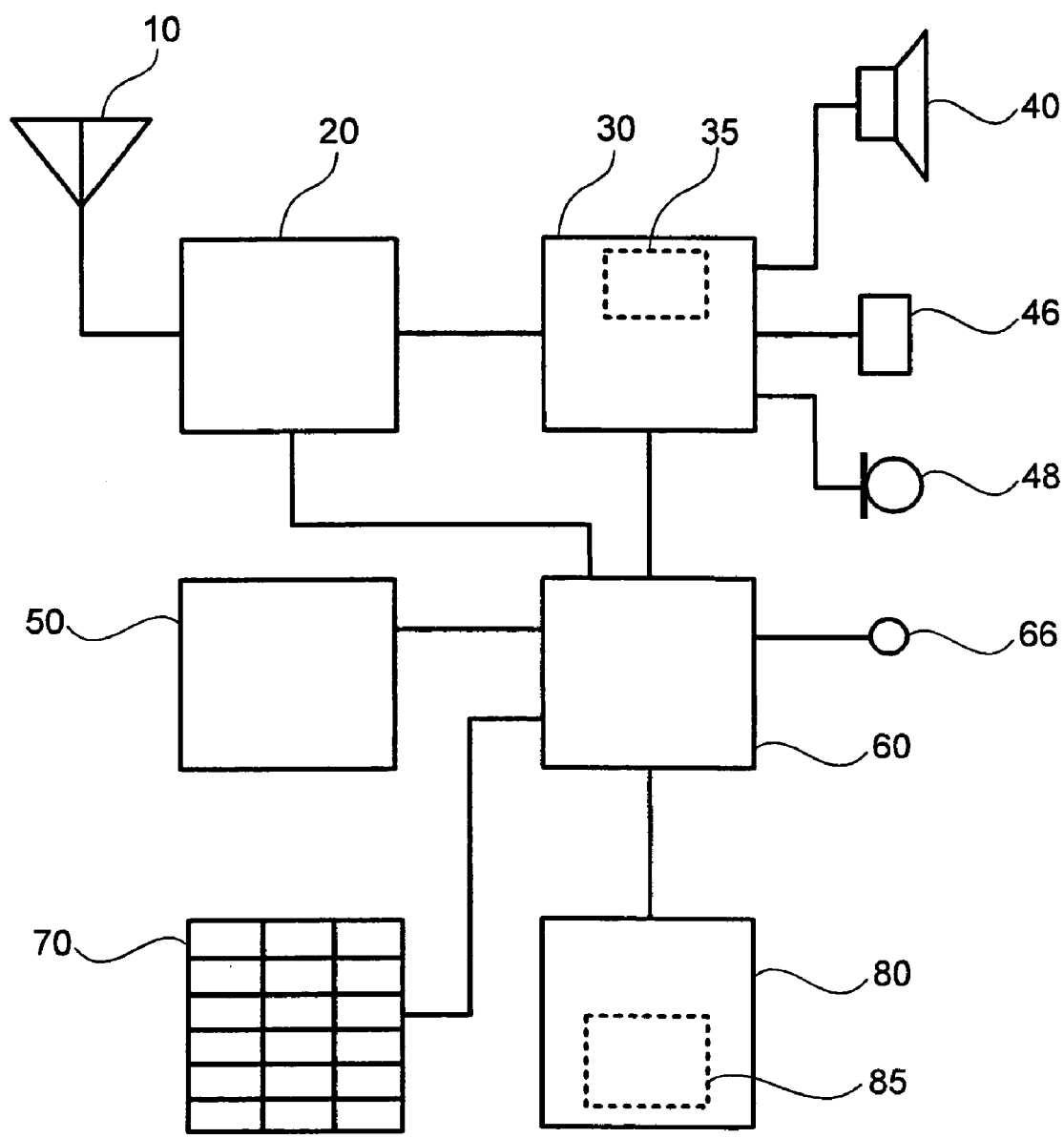
FIG. 1 is a block diagram showing the circuit configuration of a cellular phone according to a first embodiment of the present invention.

As shown in FIG. 1, a cellular phone according to the first embodiment of the present invention is provided with an antenna 10, a high-frequency circuit unit 20 connected with the antenna 10, an audio circuit unit 30 connected with the high-frequency circuit unit 20, and a speaker 40, a receiver 46, and a microphone 48 (hereinafter referred to as a mike) connected with the audio circuit unit 30. The audio circuit unit 30 includes an FM sound source 35 that generates receiving sound. The cellular phone according to the first embodiment is further provided with a CPU 60 as a control means for controlling various functions. The CPU 60 controls the high-frequency circuit unit 20 and the audio circuit unit 30 according to a control program stored in a memory 80 that is connected to the CPU 60. The CPU 60 is connected with a control unit 70 and a display unit 50. The CPU 60 controls the high-frequency circuit unit 20 and the audio circuit unit 30 also according to input from the control unit 70 based on a control program, and displays on the display unit 50 information necessary for communications, such as the state electric waves, the telephone number of the person at the other end of a phone call, e-mail addresses, and e-mail data to be received or transmitted, and the like or information necessary for the user of the cellular phone.

Figure 2:
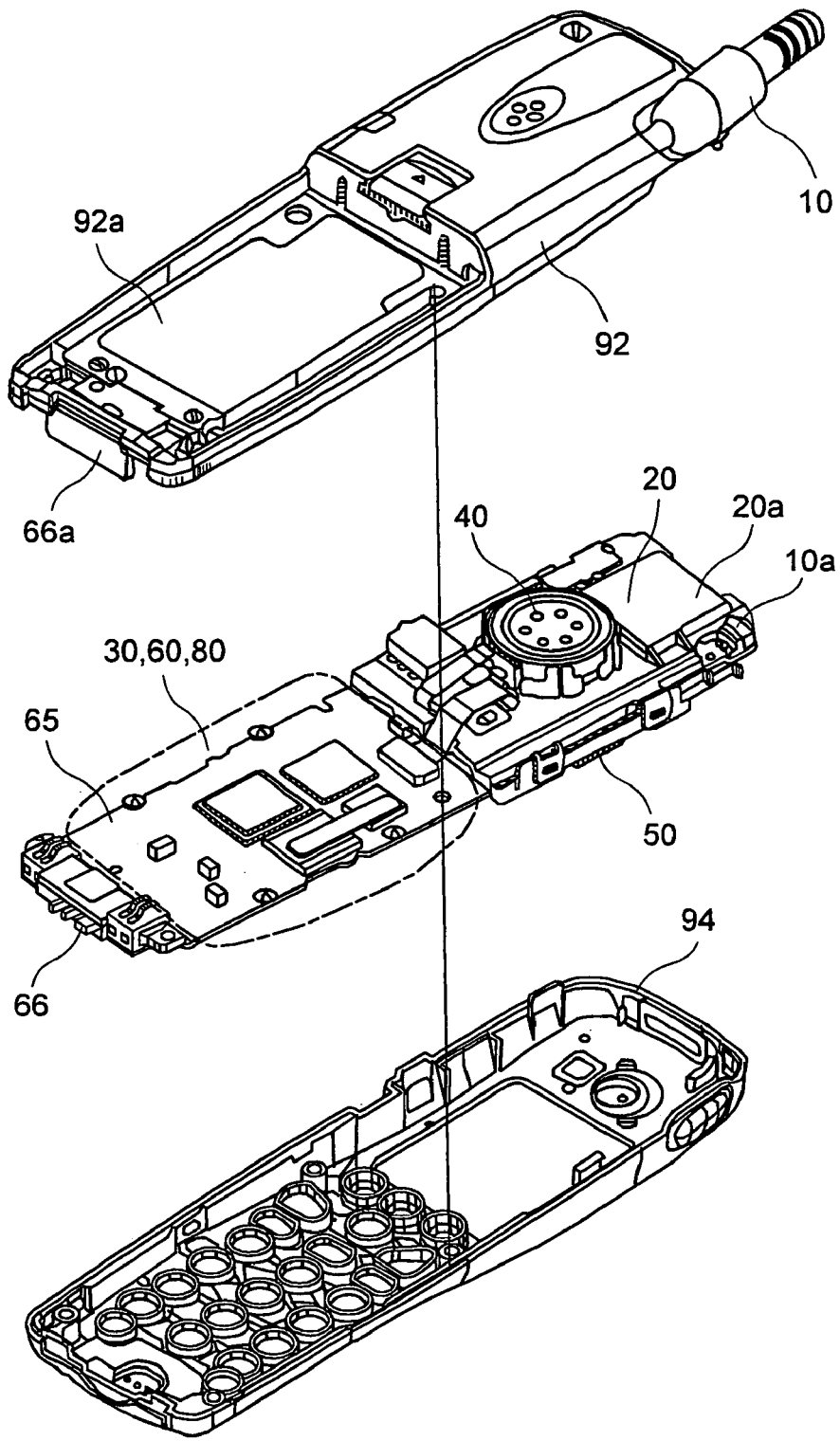
FIG. 2 is an exploded perspective view of the structure of a cellular phone according to a first embodiment of the present invention.
Figure 3:
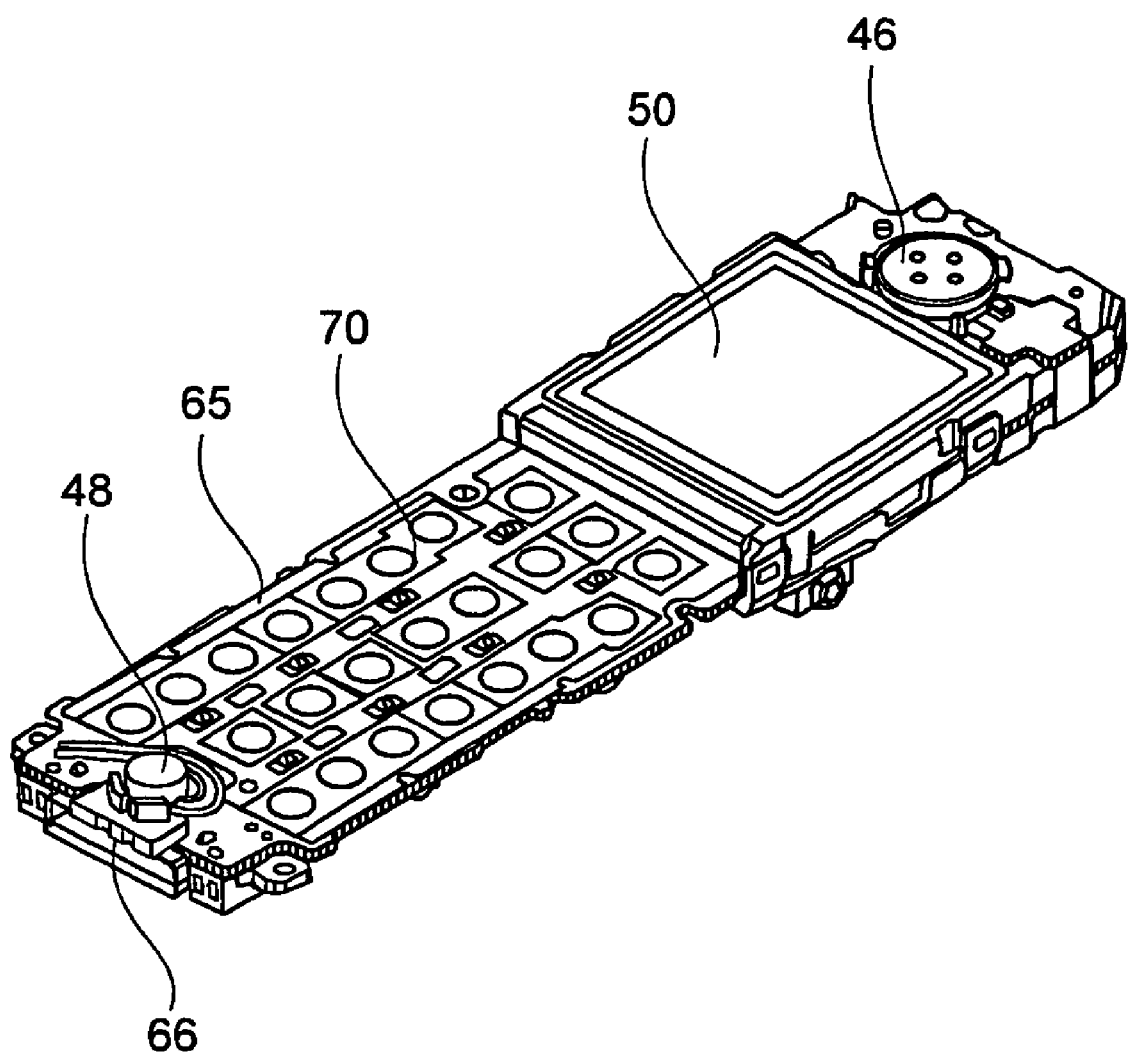
FIG. 3 is a perspective view of the circuit board of a cellular phone according to a first embodiment of the present invention.

As shown in FIGS. 2 and 3, the high-frequency circuit unit 20, the audio circuit unit 30, the CPU 60, the memory 80, the control unit 70, the display unit 50, the speaker 40, the receiver 46, and the mike 48 are mounted on a circuit board 65. For the convenience of description, suppose that the side where the control unit 70 is mounted is a front side, and the opposite side is a rear side. Then the control unit 70, the display unit 50, the receiver 46, and the mike 48 are mounted on the front side of the circuit board 65, while the high-frequency circuit unit 20, the audio circuit unit 30, the CPU 60, the memory 80, and the speaker 40 are mounted on the rear side of the circuit board 65. The high-frequency circuit unit 20 is covered with a shield 20a, and the speaker 40 is placed on the surface of the shield 20a with an elastic member situated intermediate between the speaker 40 and the surface of the shield 20a. On a side of the circuit board 65 where the mike 48 is placed, there is provided a connector 66 for connection with a charging adapter or for data communication with a personal computer (hereinafter referred to as PC) or the like. A casing 90 comprises of a case 92 and a cover 94. The case 92 covers the rear side of the circuit board 65, while the cover 94 covers the front side of the circuit board 65. The antenna 10, which is capable of telescoping, is placed on a side of the case 92 where the speaker 40 is mounted, and connected to the high-frequency circuit unit 20 via a contact piece 10a provided on the rear side of the circuit board 65 in an entirely housed state or in an entirely extended state. A cover 66a that can open and close is provided on a side of the case 92 that is opposite to the antenna 10 side so as to cover an opening of the connector 66. A battery housing unit 92a for housing a rechargeable battery 93, shown in FIG. 4, is formed on the external surface of the rear side of the case 92.

Figure 4:
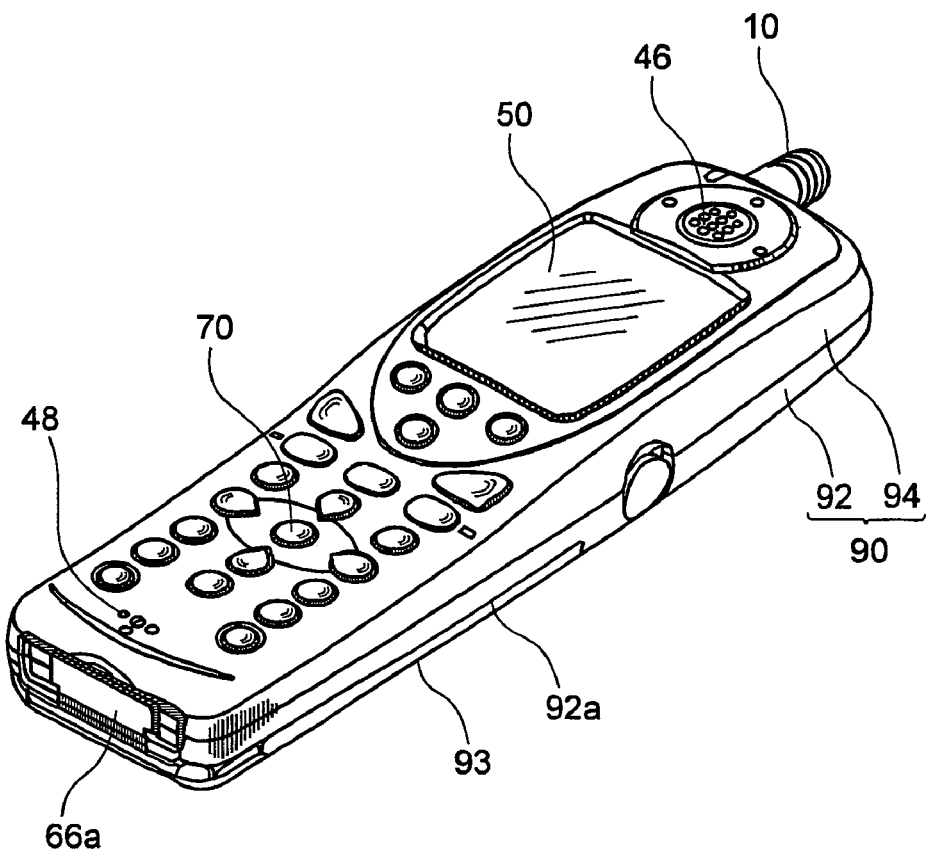
FIG. 4 is a perspective view of the outward appearance of a cellular phone according to a first embodiment of the present invention.

As shown in FIG. 4, there is provided on the cover 94 the receiver 46, the display unit 50, the control unit 70, and the mike 48 along a direction from the antenna 10 side to the cover 66a side.

The cellular phone according to the first embodiment has a function of reproducing a melody on receiving a call, instead of a bell sound. Data comprising the melody is stored in a melody memory unit 85 in the memory 80. The melody is reproduced mainly from four types of melody data, that is: (1) fixed melody data stored in the melody memory unit 85 when the cellular phone is manufactured; (2) melody data downloaded via the Internet after the user purchased the cellular phone, and stored in the melody memory unit 85; (3) melody data transferred via e-mail after the user purchased the cellular phone, and stored in the melody memory unit 85; and (4) melody data created by the user by using a terminal such as a PC after the user purchased the cellular phone, and stored in the melody memory unit 85.

The melody is formed by inputting note data including tone data for imitating the tone of a musical instrument, as well as data on intervals, scales, and sound length. In a specific embodiment, the tone data provides 128 types of basic tones including those of a piano, a guitar, a flute, and a synthesizer. If necessary, the variety of sound expression can be increased by adding other tone data.

Figure 5:
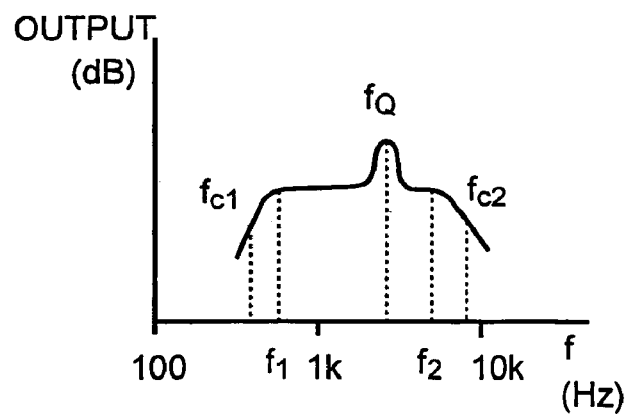
FIG. 5 is a graph showing the frequency characteristics of the speaker of a cellular phone according to a first embodiment of the present invention.

FIG. 5 is a graph showing the frequency characteristics of the speaker of the first embodiment. The speaker 40 is capable of outputting an input signal in the form of sound waves in a frequency range between fc1, the lowest frequency, and fc2, the highest frequency. According to the first embodiment, fc1 is 400 Hz, and fc2 is 8 kHz. The speaker 40 has substantially flat output characteristics particularly in a frequency range of f1 to f2, and the characteristic peak is set at a frequency fQ, which is used to reproduce the bell sound of the phone. According to the first embodiment, f1 is 600 Hz, and f2 is 5 kHz. Also, the frequency fQ is 2 kHz to 3 kHz, and the peak is set in such a way that a standard bell sound (ON for one second at a frequency of 2 kHz to 3 kHz and OFF for two seconds) can be produced at a high sound volume level of about 95 dB.

Figures 6, 7:
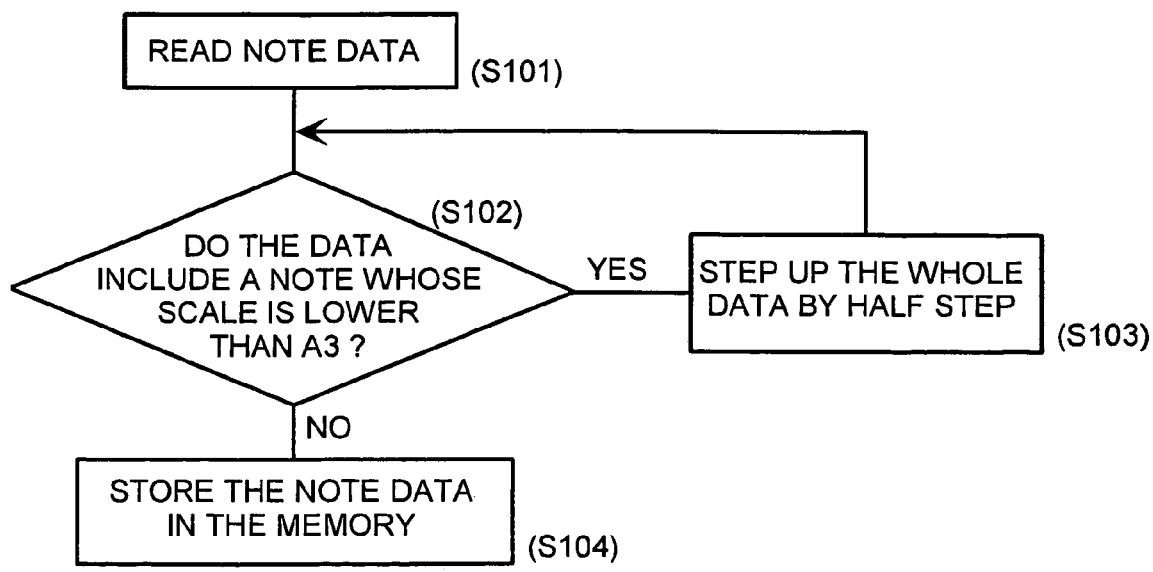
FIG. 6 shows the relation between the chords and the frequencies of note data used for a cellular phone according to a first embodiment of the present invention.
FIG. 7 is a flowchart showing a frequency shift of a cellular phone according to a first embodiment of the present invention.

The range between 600 Hz to 5 kHz provides excellent conversion efficiency, and therefore provides a high level of sound pressure even with a little electric power. In the first embodiment, note data is set in such a way that a melody can be formed within a range between a first frequency fc1 of 400 Hz and a second frequency fc2 of 8 kHz. As shown in FIG. 6, of the scale chords, G#3 (415.3 Hz) exceeds the frequency of 400 Hz; however, a frequency equal to a scale chord A3 (440.0 Hz) or higher than the scale chord A3 is used in the first embodiment to prevent power consumption at the frequency fc1 or lower.

In order to form a melody, tone data and note data are stored in specified order in the melody memory unit 85, which serves as a memory means. In the first embodiment, a melody is reproduced with an accompanying chord. For the tone of the chord, the tone of a musical instrument different from that playing the melody is used. In this case, tone data (first tone data) corresponding to the musical instrument that plays the melody and note data to be played with the tone data are stored in specified order in the melody memory unit 85. Also, tone data (second tone data) corresponding to the musical instrument that plays the chord notes and note data to be played with the tone data are stored in specified order in the melody memory unit 85. Depending on the musical number, a plurality of pieces of note data to be played with third tone data, a plurality of pieces of note data to be played with fourth tone data, and so forth, are also stored in specified order in the melody memory unit 85. The CPU 60 serving as a control means controls the FM sound source 35 in such a manner that the FM sound source 35 serving as a signal generating means generates an audio signal corresponding to the melody and an audio signal corresponding to the chord notes with predetermined timing. The timing is set in such a manner as to make the person hearing the melody perceive the chord. More specifically, the timing is set in such a manner as to make the audio signals simultaneous, or make a time difference between the audio signals controlled to such a degree that the audio signals are perceived as simultaneous.

A sound imitating an acoustic bass and other musical instruments that produce low-pitched sound, for example, is used in some cases as the tone of the chord. In this case, the scale frequency of the inputted note data can be lower than fc1, depending on the melody. In a case where fixed melody data is stored in the melody memory unit 85 when the cellular phone is manufactured, or in a case where melody data is created by the user by using a terminal such as a PC after the user purchased the cellular phone, and stored in the melody memory unit 85, a melody is formed by selecting in advance a chord whose frequency is 400 Hz or more even in a low range as note data to be stored. In a case where melody data is downloaded via the Internet after the user purchased the cellular phone, and stored in the melody memory unit 85, or in a case where melody data is transferred via e-mail after the user purchased the cellular phone, and stored in the melody memory unit 85, scale correction software is stored in the memory 80 so that the CPU 60 shifts the scale of the note data and thereby makes the frequency become 400 Hz or more, as shown in FIG. 7. Specifically, the CPU 60 reads note data (S101) to determine whether the note data includes a note whose scale is lower than A3 (S102). If the answer is Yes, the CPU 60 steps up the whole note data to be reproduced with the tone of the selected musical instrument by a half step (frequency shift) (S103), and determines again whether the note data includes a note whose scale is lower than A3 at the step S102. If the answer is Yes, the CPU 60 repeats the steps S103 and S102 of stepping up the note data by a half step and determining again whether the note data includes a note whose scale is lower than A3. If the answer is No, the CPU 60 proceeds to setting operation (S104). The set note data is stored in a predetermined area in the melody memory unit 85. Thus, all of the note data to be reproduced falls within a range of 400 Hz to 8 kHz. Therefore, electric power consumed by the speaker 40 is not wasted, and the level of the input signal can be increased within a range of allowable input power values of the speaker 40. It is not necessary to lower the level of the input signal even when the melody is to be reproduced with a chord because the inputted note data falls within a frequency range of 400 Hz to 8 kHz.

According to the first embodiment, especially in the case of a melody with a few low-pitched parts, most of the note data falls within a frequency range of 600 Hz to 5 kHz even when the melody is accompanied by a chord. Therefore, the electric power of the input signal can be efficiently converted into sound energy, thereby making it possible to reproduce the melody at a high sound volume level. In addition, even when the low-pitched parts are accompanied by a chord, the note data falls within a frequency range of 400 Hz to 8 kHz. Therefore, all of the chord notes can be reproduced, thereby producing agreeable, natural sound and allowing the user to hear high-quality receiving sound.

Figure 8:
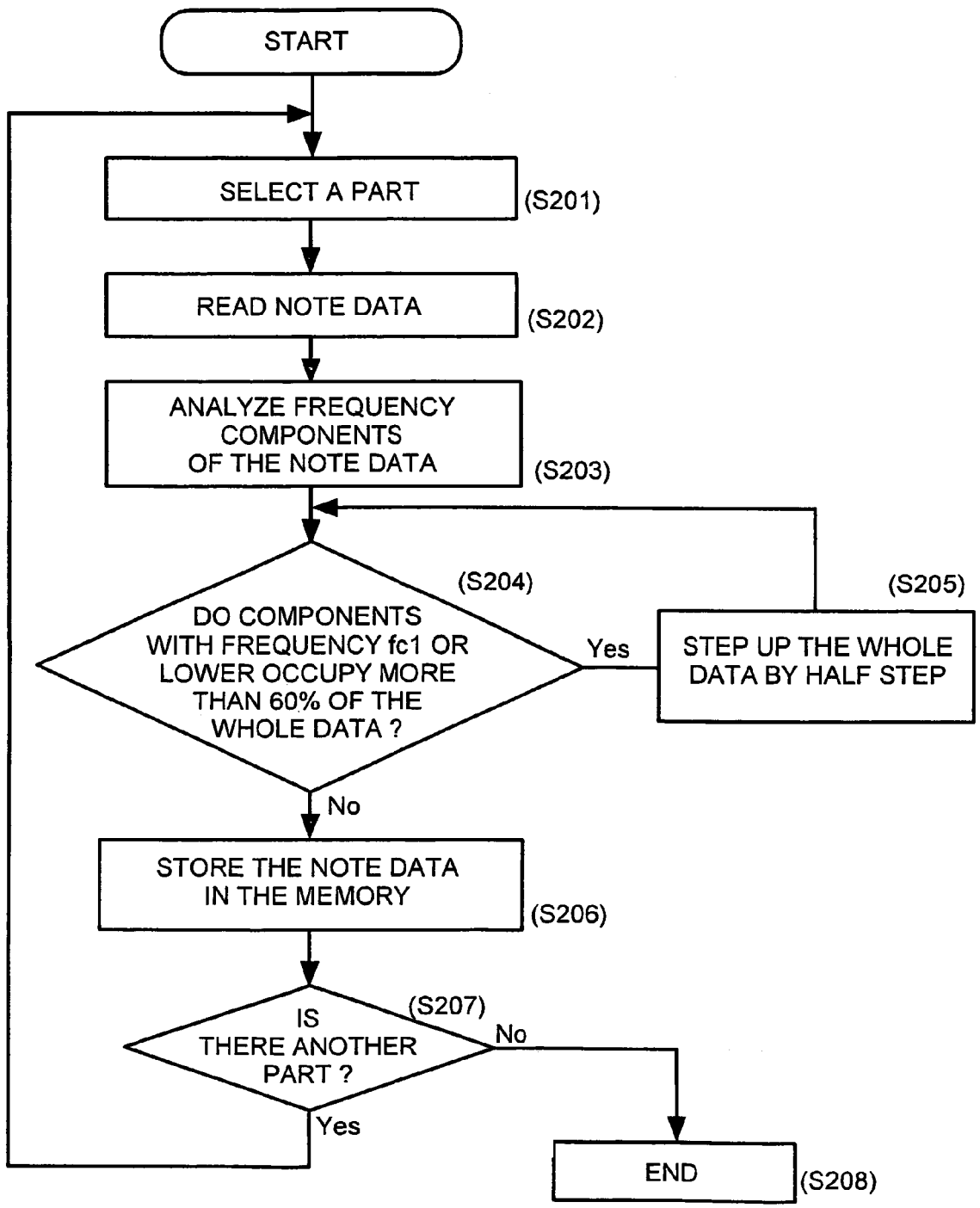
FIG. 8 is a flowchart showing a frequency shift of a cellular phone according to a second embodiment of the present invention.
Figure 9:
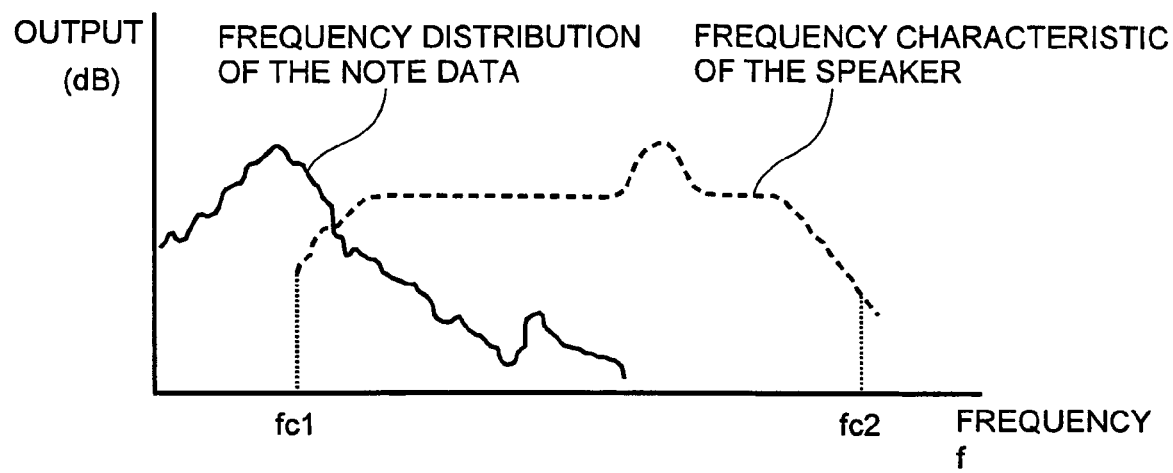
FIGS. 9(a) and 9(b) are charts showing the frequency characteristics of the speaker of a cellular phone according to a second embodiment of the present invention as well as a frequency distribution of note data before and after it has been stepped up, FIG. 9(a) being a characteristic chart showing the frequency distribution of the note data before it has been stepped up and FIG. 9(b) being a characteristic chart showing the frequency distribution of the note data after it has been stepped up.
Figure 9:
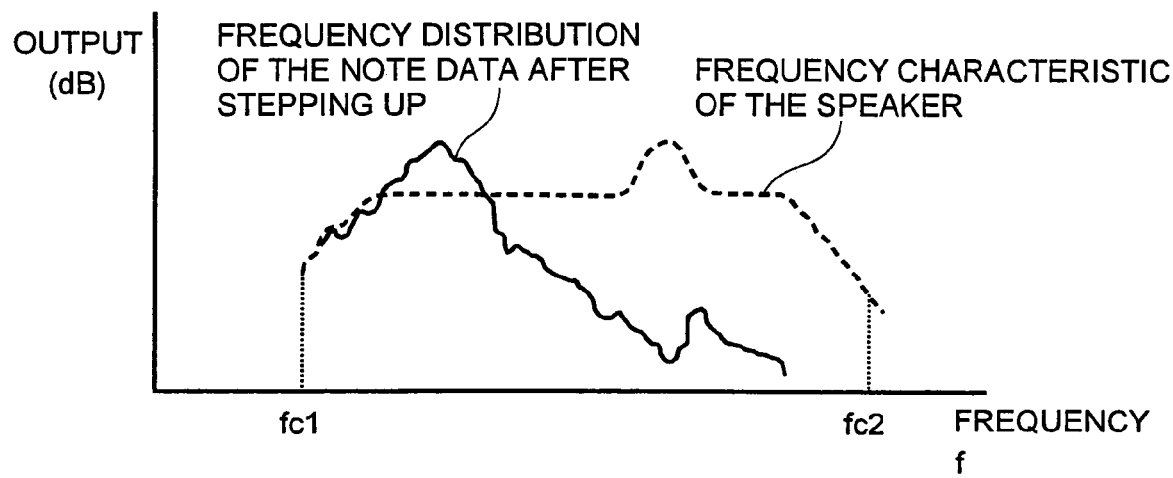

A second embodiment of the present invention will be described with reference to FIGS. 8 and 9. In the second embodiment, provided note data includes a plurality of musical parts. Therefore, as shown in FIG. 8, a part is first selected (S201), and then note data included in the selected part is read (S202) in order to perform energy analysis, that is, analyze frequency components of the note data (S203). Then, whether the note data is to be stepped up or not is determined, depending on the result of the analysis. In the second embodiment, the distribution of frequency components of the note data is analyzed after the note data is read, as shown in FIG. 8. For example, analysis is performed by determining the distribution of notes at each scale. As shown in FIG. 5, the speaker 40 is capable of outputting an input signal in the form of sound waves in a frequency range between fc1, the lowest frequency, and fc2, the highest frequency, where fc1 is 400 Hz, and fc2 is 8 kHz, for example. Based on the result of the analysis of frequency components, the proportion of the whole note data occupied by notes having a frequency fc1 or lower is calculated to determine whether the proportion is more than 60% (S204). If the proportion of the whole note data occupied by notes having a frequency fc1 or lower exceeds 60%, most of the sound will not be reproduced. Therefore, the note data is stepped up when the proportion of the note data occupied by notes having a frequency fc1 or lower is more than 60% (S205). As in the case of the first embodiment, the whole note data included in the selected part is stepped up by a half step, and the steps S205 and S204 are repeated until the proportion of the note data occupied by notes having a frequency fc1 or lower becomes less than 60%. If the proportion of the note data occupied by notes having a frequency fc1 or lower becomes less than 60%, scale setting operation is performed (S206). Then whether there is another part or not is determined (S207). If there is another part, the processing returns to the step S201. If there is no other part, the processing ends (S208). Accompanying parts in a low range often fall outside of the low range that can be reproduced by the speaker especially when the melody signaling receipt of a call includes a chord. This tendency becomes more obvious as the number of accompanying parts is increased. In the second embodiment, when there are a large number of accompanying parts, distribution of frequency components of note data is analyzed for each of the parts, and whether the note data is to be stepped up or not is determined for each of the parts. For example, if there are three accompanying parts other than the melody part, and one of the three parts in a low range, such as an acoustic bass, falls outside of the low range of the speaker, as shown in FIG. 9(*a*), only that part is stepped up until it reaches a state shown in FIG. 9(*b*) so that all of the parts exist within the range that can be reproduced by the speaker. An audio signal for each of the parts is controlled by the control means in such a way that the audio signal is reproduced with predetermined timing. The timing is set in such a manner as to make the person hearing the melody perceive the chord. More specifically, the timing is set in such a manner as to make the audio signals simultaneous, or make a time difference between the audio signals controlled to such a degree that the audio signals are perceived as simultaneous. This makes it possible for the user of the cellular phone to enjoy a melody with a chord. It is to be noted that if distribution of frequency components of note data falls way outside of the low range of the speaker, the note data may be stepped up not by a half step but by a whole step or more.

The possibility that an accompanying part in a low range includes sound at a frequency of 400 Hz or lower at a rate of more than 60% is increased especially when a melody has three accompanying parts, which is called a four-chorded melody, or a melody has more than three accompanying parts. In this case, the resulting sound may be monotonous if all of the parts are stepped up to more than 400 Hz. In such a case, a melody can be reproduced in a wide range by using a speaker capable of reproducing a wider frequency range or, for example, a speaker capable of reproducing a low range down to 200 Hz, and determining for each part whether the note data is to be stepped up or not by using 200 Hz as a criterion for judgment. Specifically, it is possible to reproduce sound down to a scale chord A2, and therefore it is possible to widen the reproducible range by one octave as compared with the case where 400 Hz is used as a criterion.

This makes it possible to reproduce most of the sound of accompanying parts such as an acoustic bass, whose sound is distributed in a low range at a rate of 70% to 80%, by stepping up the note data. As for an accompanying part played by a musical instrument producing a wide range of sound, the proportion of the note distribution of the accompanying part that falls outside of the low range of the speaker is small, and therefore the note data is not stepped up. Thus, it is possible to prevent the sound of the accompanying part on the high range side from falling outside of the reproducible range of the speaker after it has been stepped up. Therefore, in the second embodiment, most of the sound of each part can be contained within the reproducible range of the speaker even when the number of chord notes is increased.

The preceding has been a description of the preferred embodiment of the invention. It will be appreciated that deviations and modifications can be made without departing from the scope of the invention, which is defined by the appended claims.

What is claimed is:

1. A melody sound reproducing unit comprising;
    an input unit which inputs melody data for a plurality of notes;
    a controller which shifts the plurality of notes of the melody data inputted by the input unit by half-steps when a frequency of the inputted melody data is not in a predetermined range, the controller shifting the notes by half steps until the melody data is entirely within the predetermined range;
    a memory which stores melody data inputted by the input unit when a frequency of the inputted melody data is in the predetermined range, and stores melody data shifted by the controller when the frequency of the inputted melody data is not in the predetermined range;
    a signal generator for generating an audio signal based on melody data stored in the memory; and
    a speaker for outputting an audio signal generated by the signal generator.

2. The melody sound reproducing unit according to claim 1, wherein the predetermined range is a range between a first and a second frequency.

3. The melody sound reproducing unit according to claim 2, wherein the first frequency is 400 Hz and the second frequency is 8 kHz.

4. The melody sound reproducing unit according to claim 1,
    wherein the melody data includes a first tone data and a second tone data, and
    wherein the signal generator generates a first audio signal corresponding to the first tone data and a second audio signal corresponding to the second tone data with predetermined timing.

5. The melody sound reproducing unit according to claim 4, wherein the first audio signal and the second audio signal form a chord relation in intervals and scales with each other.

6. A melody sound reproducing unit comprising:
    an input unit which inputs melody data for two or more notes;
    a controller which changes the frequency spectrum of a melody data inputted by the input unit to produce a melody data whose frequency spectrum is in a range between a first frequency and a second frequency when a frequency of the inputted melody data is not in the range, the controller changing the two or more notes by half-steps until the melody data is entirely in the range;
    a memory which stores melody data inputted by the input unit when a frequency of the inputted melody data is in the range, and stores melody data shifted by the controller when the frequency of the inputted melody data is not in the range;
    a signal generator for generating an audio signal based on melody data stored in the memory; and
    a speaker for outputting an audio signal generated by the signal generator.

7. The melody sound reproducing unit according to claim 6, wherein the first frequency is 400 Hz and the second frequency is 8 kHz.

8. A melody sound recording method, said method comprising:
    inputting melody data for a plurality of notes;
    determining whether a frequency of the inputted melody data is in a predetermined range;
    shifting the plurality of notes of the inputted melody data by half-steps when the frequency of the inputted melody data is not in the predetermined range, the shifting continuing until the frequency of the inputted melody data is entirely within the predetermined range;
    storing the inputted melody data when the frequency of the inputted melody data is in the predetermined range, and storing melody data whose scale is shifted when the frequency of the inputted melody data is not in the predetermined range;
    generating an audio signal based on stored melody data; and
    outputting generated audio signal.

9. The melody sound recording method according to claim 8, wherein the predetermined range is a range between a first and a second frequency.

10. The melody sound recording method according to claim 9, wherein the first frequency is 400 Hz and the second frequency is 8 kHz.

11. The melody sound recording method according to claim 8,
    wherein the melody data includes a first tone data and a second tone data, and
    wherein a first audio signal corresponding to the first tone data and a second audio signal corresponding to the second tone data are generated with predetermined timing.

12. The melody sound recording method according to claim 11, wherein the first audio signal and the second audio signal form a chord relation in intervals and scales with each other.

13. A melody sound recording method, said method comprising:

inputting melody data for two or more notes;

changing all of the frequency components of inputted melody data to produce melody data whose frequency components fall within a range between a first frequency and a second frequency when a frequency component of the inputted melody data is not in the range, the two or more notes of the melody data being shifted by half-steps until the frequency components fall within the range;

storing the inputted melody data when the frequency of the inputted melody data is in the range, and storing melody data whose scale is shifted when the frequency of the inputted melody data is not in the range;

generating an audio signal based on stored melody data; and outputting generated audio signal.

14. The melody sound recording method according to claim 13, wherein the first frequency is 400 Hz and the second frequency is 8 kHz.

* * * * *